(No Model.) 6 Sheets—Sheet 3.
S. P. McKELVEY.
APPARATUS FOR FORMING CONCRETE CURBS AND GUTTERS.
No. 544,235. Patented Aug. 6, 1895.
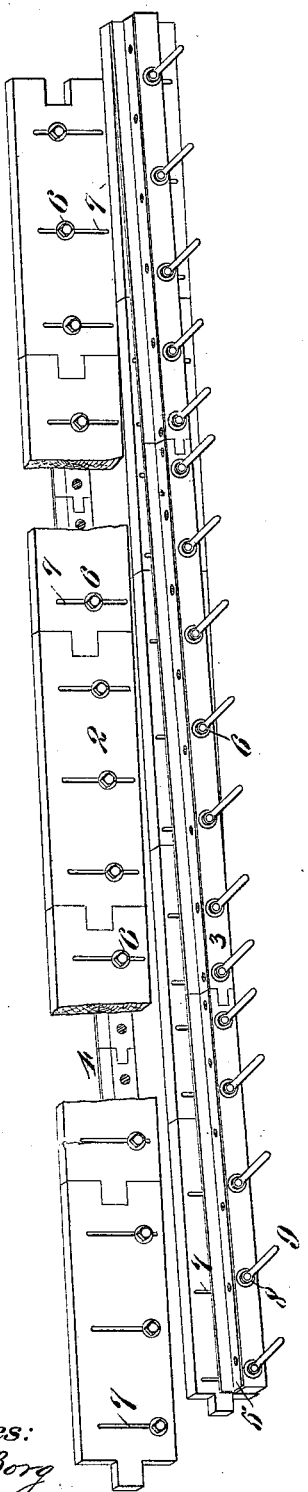
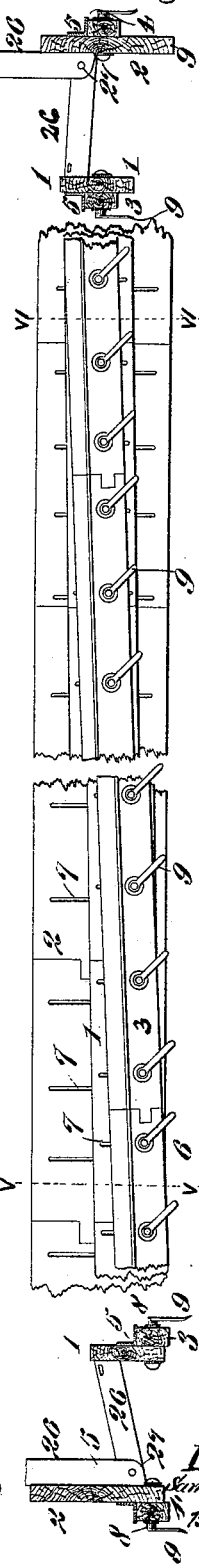
Witnesses:
Fred Borg
Inventor:
Sam'l P. McKelvey

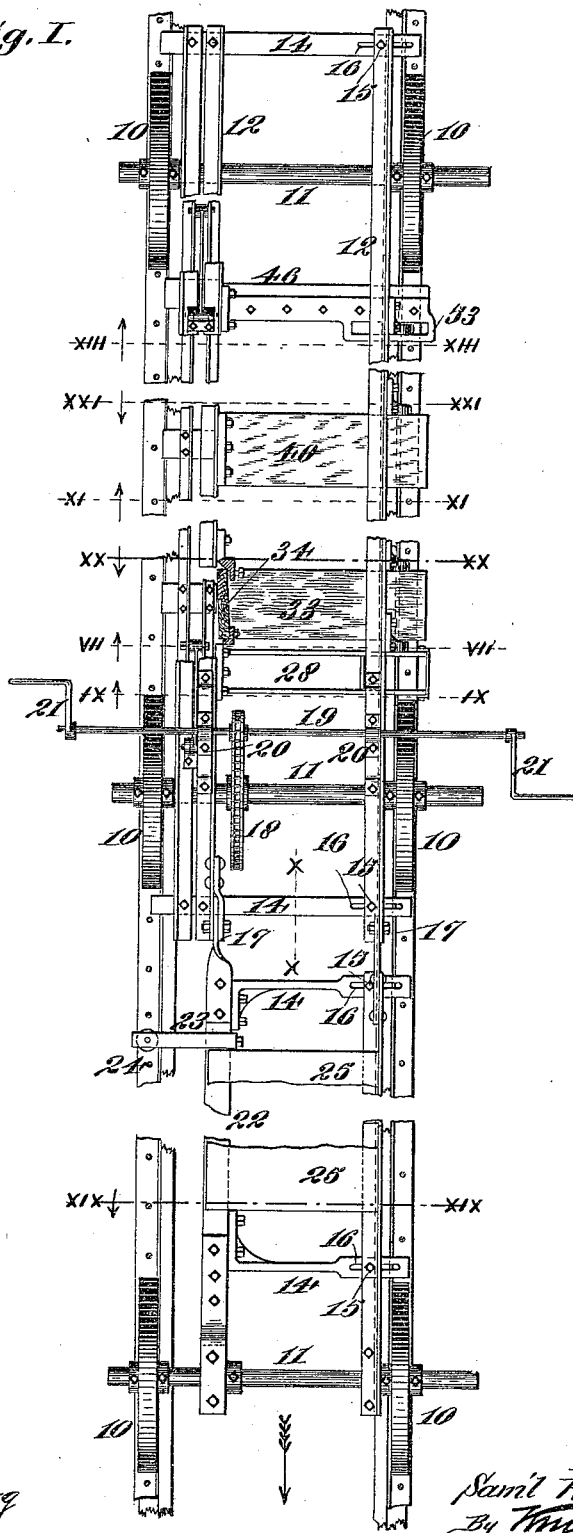

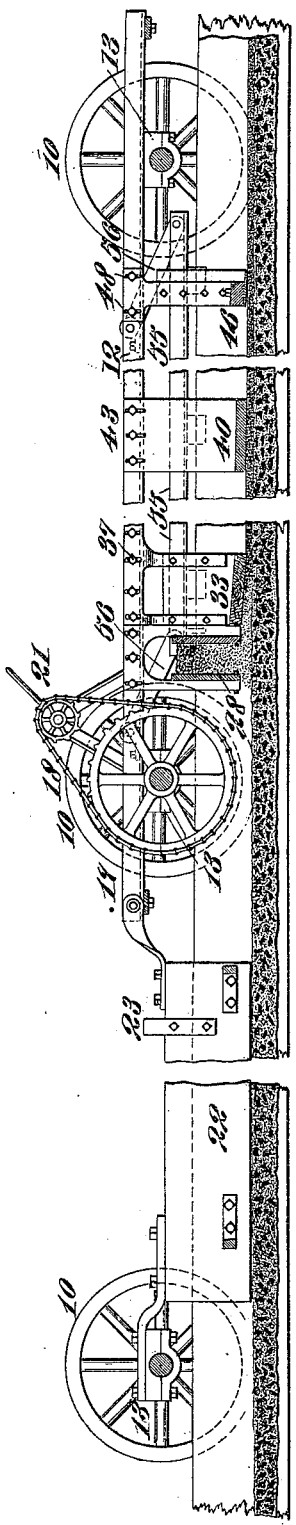

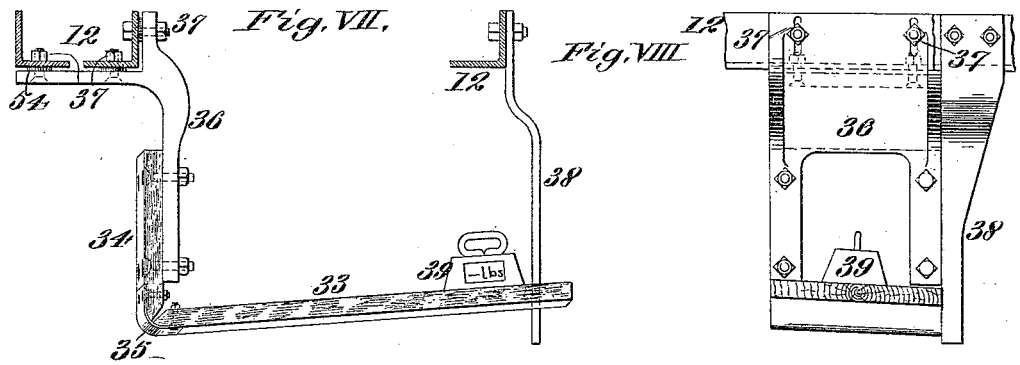
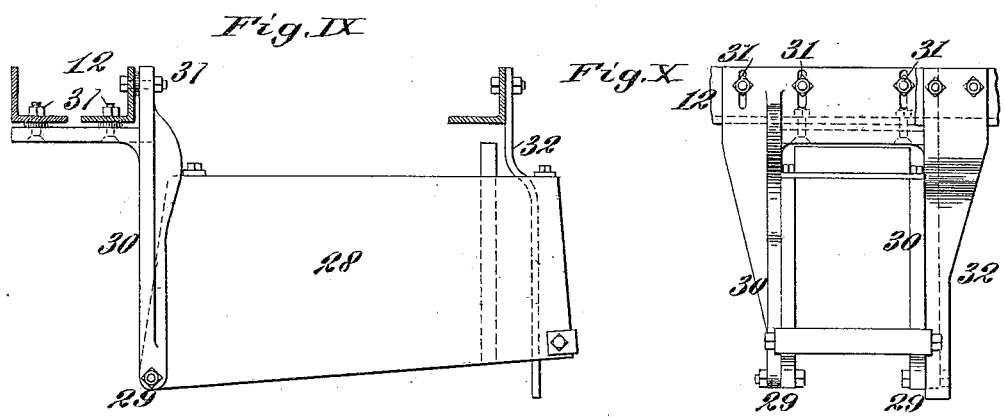
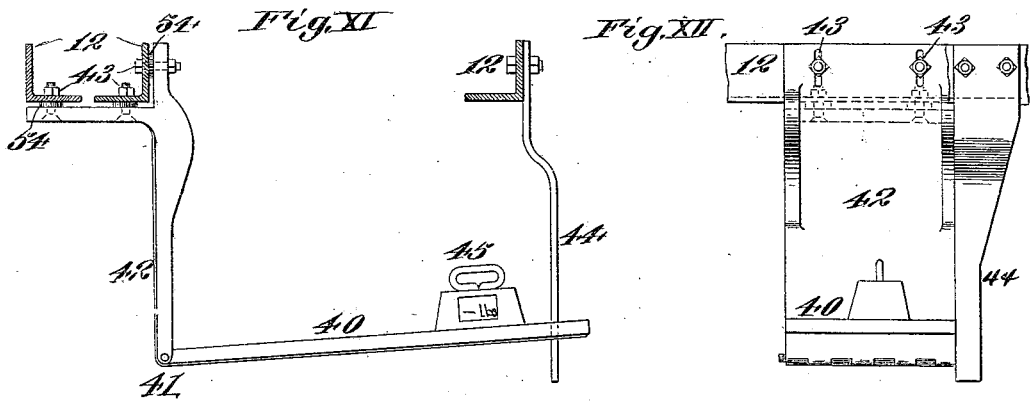

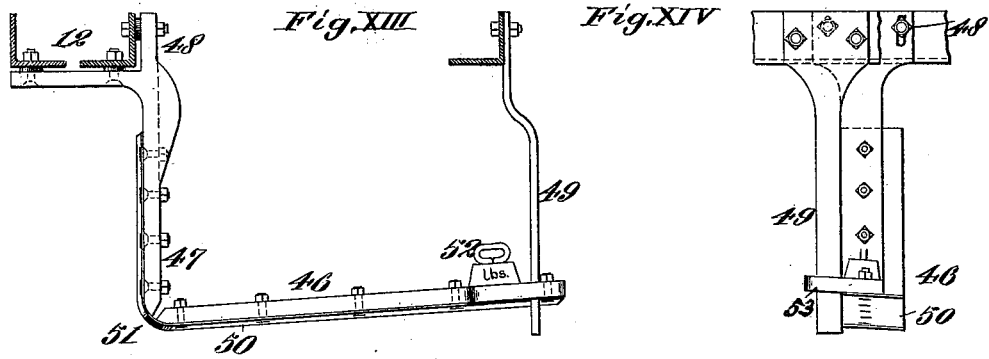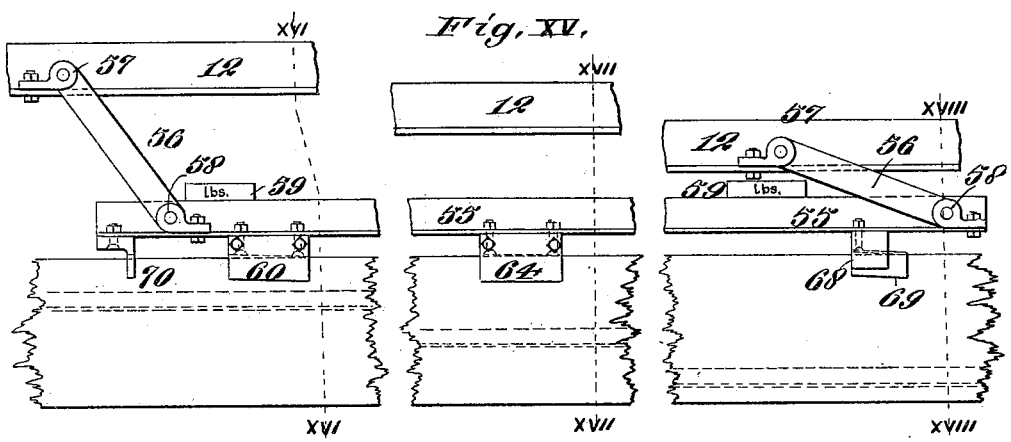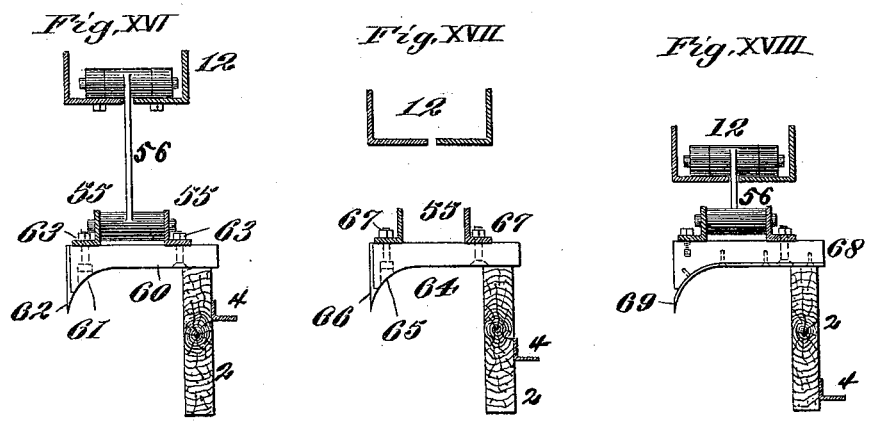

(No Model.) 6 Sheets—Sheet 6.
S. P. McKELVEY.
APPARATUS FOR FORMING CONCRETE CURBS AND GUTTERS.
No. 544,235. Patented Aug. 6, 1895.
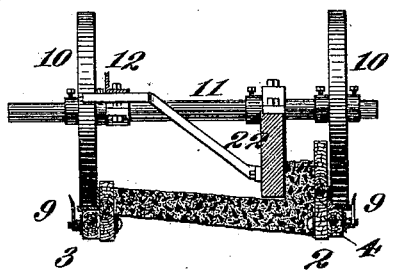
Fig. XIX
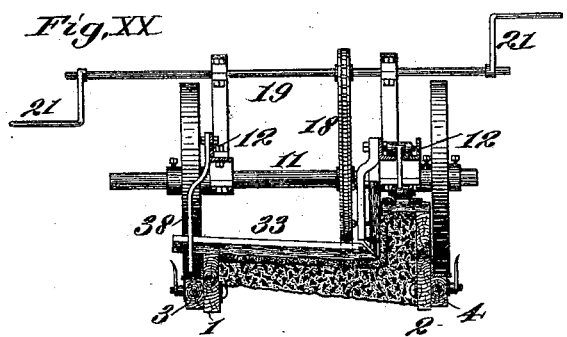
Fig. XX
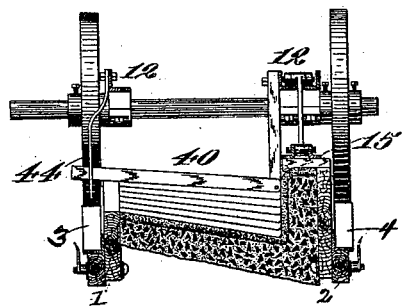
Fig. XXI
Witnesses:
Fred. Borg
D. Finley.
Inventor
Sam'l P. McKelvey
By Knight Bro
att'ys

UNITED STATES PATENT OFFICE.

SAMUEL P. McKELVEY, OF CHICAGO, ILLINOIS, ASSIGNOR OF ONE-HALF TO JOHN DOLESE AND JASON H. SHEPARD, OF SAME PLACE.

APPARATUS FOR FORMING CONCRETE CURBS AND GUTTERS.

SPECIFICATION forming part of Letters Patent No. 544,235, dated August 6, 1895.

Application filed March 18, 1895. Serial No. 542,187. (No model.)

*To all whom it may concern:*

Be it known that I, SAMUEL P. MCKELVEY, of Chicago, in the county of Cook, State of Illinois, have invented a certain new and useful Improvement in Apparatus for Forming Concrete Curbs and Gutters, of which the following is a full, clear, and exact description, reference being had to the accompanying drawings, forming part of this specification.

My invention relates to an apparatus for forming concrete or artificial curb and gutter work, whereby the work is done more uniformly and more expeditiously than by the old hand method.

My invention consists in features of novelty hereinafter fully described, and pointed out in the claims.

Figure I is a top or plan view of my machine or apparatus with parts broken away. Fig. II is a vertical longitudinal section of the machine. Fig. III is a perspective view showing the front and back boards and the tracks upon which the machine travels. Fig. IV is an elevation of same. Fig. V is a section taken on line V V, Fig. IV. Fig. VI is a section taken on line VI VI, Fig. IV. Fig. VII is a section taken on line VII VII, Fig. I, looking in the direction of the arrow that crosses the section-line. Fig. VIII is a detail side view illustrating the part shown in Fig. VII. Fig. IX is a view like Fig. VII, but taken on line IX IX, Fig. I. Fig. X is a detail side view illustrating the part shown in Fig. IX. Fig. XI is a view like Figs. VII and IX, but taken on line XI XI, Fig. I. Fig. XII is a detail side view illustrating the part shown in Fig. XI. Fig. XIII is a view like Figs. VII, IX, and XI, but taken on line XIII XIII, Fig. I. Fig. XIV is a detail side view illustrating the part shown in Fig. XIII. Fig. XV is a side elevation illustrating the manner of supporting and carrying the floats and straight-edge or "striking-off piece" that apply the surface coating to the curb. Fig. XVI is a section taken on line XVI XVI, Fig. XV. Fig. XVII is a section taken on line XVII XVII, Fig. XV. Fig. XVIII is a section taken on line XVIII XVIII, Fig. XV. Fig. XIX is a section taken on line XIX XIX, Fig. I, looking in the direction of the arrow that crosses the section-line. Fig. XX is a similar view taken on line XX XX, Fig. I. Fig. XXI is a similar view taken on line XXI XXI, Fig. I.

Referring to the drawings, 1 represents the front board that forms the outer edge of the gutter, and 2 the back board that forms the outer side of the curb, as usual. These boards I prefer to make up of sections, as shown in Fig. III, with tenon and mortise connections between the sections.

3 represents a track or rail secured to the outside of the front board 1, and 4 a track or rail secured to the outside of the back board 2, these tracks being preferably faced with metal angle-straps 5. (See Figs. III and V.) I have shown the rails secured to the front and back strips by means of bolts 6, fitting in slots 7 in the front and back boards, so that the rails may be adjusted in a vertical plane. The bolts 6 are provided with nuts 8, having handles 9, by which the nuts may be readily tightened to hold the rails firmly to the front and back boards.

In some cities where there is very little natural drainage, due to the natural flat surface of the ground, it has become the practice to provide for artificial drainage in making curb and gutter work, and a common method of doing this has been to construct the top of the curbs on a level with the city grade and make the gutters drain from the corners to the centers of the blocks, placing catch-basins at the centers of the blocks, so that on a street running north and south the gutter will be constructed so as to cause the surface water to run north one half of the length of the block and south the other half of the length of the block; or sometimes the summit is made at the center of the block and the catch-basins placed at the corners of the block. A block that is three hundred feet long with the catch-basin at the center—one hundred and fifty feet from each corner—will generally have some six inches fall in the gutter to the one hundred and fifty feet, and the curb is generally made four inches high at the summit and ten inches high at the catch-basin, and to add to the difficulty of making combination curb and gutter conform to this kind of street construction the authorities generally require that the cross-grade of the gutter shall be different at the summit from what it is at the catch-basin, so that the inclination of the gutter shall correspond with the grade of the street. The rule as to this has generally been to have the cross-grade of the gutter one-half inch to the foot at the summit and one inch to the foot at the catch-basin, or in an eighteen-inch gutter the cross-grade at the summit will be one and one-half inches to conform to the crown of the street and three inches at the catch-basin, and this one and one-half inches additional slant in the gutter must be gradual from summit to catch-basin.

While my machine is well adapted for straight work in cities having natural grade sufficient for drainage, it is equally well adapted for doing work where this artificial drainage has to be made. I have in the drawings shown the parts arranged for doing work where artificial drainage is required, and as shown in Figs. III and IV the rails 3 and 4 are placed at an inclination instead of being placed parallel to the front and back boards, as they would be placed for straight work or where artificial drainage did not have to be provided for, and the slots 7 in the front and back boards provide for a ready variation in the inclination of the rails.

10 represents the supporting-wheels of my machine, of which I have shown three pairs, each pair being connected by an axle or shaft 11. The wheels 10 rest and travel on the rails 3 and 4, as shown in Figs. I and XX.

12 represents the side pieces of the frame of the machine, these side pieces being journaled to the axles or shafts 11 by means of boxes 13, (see Fig. II,) and the side pieces are connected by cross-strips 14.

To provide for a variation in the width of the machine, so as to make curb and gutter work of different widths, I make the axles 11 of sufficient length for the widest curb and gutter that the machine will be used for, and I connect one of the side pieces 12 of the frame of the machine to the cross-pieces 14 by means of bolts 15, that fit in slots 16 in the cross-pieces, and if it is desired to vary the width of the frame of the machine without varying the distance apart of the supporting-wheels it may be done by loosening the bolts 15 and the bolts of the journal-boxes that connect the frame to the axles 11, and likewise if it is desired to change the distance apart of the supporting-wheels without changing the width of the frame it may be done by simply shifting the wheels on their axles.

As shown in Fig. I, the side pieces of the frame of the machine are provided with hinges 17 just forward of the intermediate pair of wheels, which are the driving-wheels, the shaft of this pair of wheels having a sprocket-wheel and chain connection 18 with a shaft 19, journaled by boxes 20 to the side pieces of the frame of the machine, the shaft 19 being provided with cranks 21, by which it is turned.

The machine moves in the direction of the arrow, Fig. I. I have shown the side pieces of the frame of the machine as being made of angle-iron, and back of the hinges 17 I have shown the side pieces of the frame on the left of Fig. I to be made of two strips or pieces of angle-iron. By providing the hinge 17, the front pair of wheels, acting with the rear pair of wheels, will not tend to lift the intermediate pair of wheels from the rails when the latter pair are at the catch-basin or lowest point in the gutter, and in like manner the front pair of wheels will not be lifted from the track as they pass over the summit of the gutter, and by making the frame detachable at 17 (and the hinge provides for the detachment at this point) the portion of the machine forward of the hinge may be separated and used independently of and a distance in advance of the remainder of the machine.

As will be hereinafter pointed out, the portion of the machine forward of the hinge 17 is designed for the purpose of building up the gutter, while the other work is done by the portion of the machine back of the hinge, and if it is desired the portion of the machine forward of the hinge may be run, as stated, independently of and in advance of the remainder of the machine; or my invention may be in a measure carried out by not using the portion of the machine forward of the hinge at all, when the curb will be built up by hand after the usual manner.

I have shown in the drawings and will assume in the description that the part of the machine forward of the hinge is employed and that it is connected to the remainder of the machine.

22 represents a strip, preferably of cast-iron and from six to nine feet long, located in the side frame of the machine that is next to the curb. (See Figs. I and II.) This strip extends in height from the gutter, before the finish is applied, to a point above the top line of the curb, and is located inside of the back board 2 a distance equal to the thickness of the curb, not including the finish.

23 represents an arm secured to the strip 22 and extending over the top of the back board, and having a roller 24 that bears against the outer face of the back board for the purpose of holding the strip 22 from lateral movement away from the back board during the operation of the machine.

25 represents a platform resting upon the top of the strip 22 at one edge, and the other edge resting upon the other side piece of the frame; and upon this platform may be dumped the concrete for forming the body of the curb. As the machine advances the concrete is dumped into the space between the strip 22 and the back board and is tamped down, the curb being thus built up to the desired height. Prior to this, however, the concrete that forms the body of the gutter has been tamped in ahead of the machine after the usual manner, so that the gutter, minus the top dressing or finish, is made in the usual way and without regard to my machine. The strip 22 is arranged so that its front end is slightly closer to the back board than its rear end, one-eighth or three-sixteenths of an inch out of line being sufficient, to prevent the concrete from sticking to the strip and to prevent the strip from disturbing the concrete after it has been tamped into place.

26 represents templets for forming the joints between the blocks of the gutter and curb, these templets being in the form of thin steel plates riveted together at 27. (See Figs. V and VI.) These templets are placed in position ahead of the machine as the rough part of the body or gutter is being made. There is some three or four feet space between the points marked X X on Fig. I, and the templets are withdrawn at this point, the body of the curb and gutter being both now formed; but before withdrawing the templets the back and front boards are marked, (this may be done by driving in tacks which may be removed after the pavement is made,) so that after the top finish is applied the workman will know where to groove the top finish so as to have these grooves over the places where the templets were when the body of the curb and gutter was made, and thus avoid surface cracking of the curb and gutter.

Just back of the intermediate or driving wheels is a box 28. (See Figs. I and II.) This box is designed to contain the top or surface dressing for both the curb and gutter, and the back or rear edge of the box forms a straight-edge for striking off this top stuff. The box is open at the bottom and on the end next to the curb to permit the discharge of the top stuff as the machine moves along. The box is hinged at 29, at its lower rear corner, to a yoke or casting 30, (see Figs. II, IX, and X,) that depends from and is made fast to the inner side frame of the machine. The yoke has slot and bolt connection 31 with the side frame, so that it may be raised or lowered to adjust the height of the box and thus provide for the discharge of a lesser or greater amount of top stuff, as may be desired. The outer end of the box rests on the top edge of the front board, and this end of the box is engaged from behind by means of an arm 32, secured to the frame 12 on this side of the machine, so that as the machine advances the arm 32 causes the outer end of the box to move along, the arm taking the strain off of the point of connection between the box and the yoke 30.

Just back of the box 28 is a float 33, preferably of wood, having an end 34 next to the curb. (See Figs. I and VII.) The end 34 is secured to the float 33 by hinged connection consisting preferably of a strap 35. (See Fig. VII.) The function of this float is to press the top stuff onto the body of the curb and gutter, and the float, including the end piece 34, is preferably set at an angle, as shown in Figs. I, II, and VII, so as to better compress the top stuff, as the forward edge of the float admits more stuff than the rear edge will permit to pass without compressing. The float 33, including its end piece 34, is secured to the side frame of the machine next the gutter by means of a yoke or casting 36, (see Figs. VII and VIII,) this yoke being bolted to the end of the float and having slot and bolt connection 37 with the side frame, so that the float may be adjusted in height to correspond to the height of the box 28. The outer end of the float 33 rests upon the top edge of the front board, and this end is propelled by an arm 38, secured to the outer side frame of the machine and engaging the float from behind, as shown in Figs. VII and VIII.

39 represents a weight that may be placed on the outer end of the float, so as to hold it down firmly on the top edge of the front board. It will be observed that the entire weight of the machine resists the upward movement of the inner end of the float 33, and the weight 39 being employed the top stuff is pressed firmly onto the body of the gutter, while the vertical movement of the outer end of the float is not interfered with except by the front board, so that the float may assume the change of horizontal inclination to correspond with the difference in the pitch or grade of the gutter from summit to catch-basin, as herein referred to. Inasmuch as the machine is incapable of lateral movement, the vertical part or end 34 of the float will also very firmly press the top stuff against the vertical or approximately-vertical wall of the gutter.

Back of the float 33 is a trowel 40. (See Figs. I, XI, and XII.) This trowel is hinged at 41 to an end piece 42, having slot and bolt connection 43 with the frame 12 on the gutter side of the machine. The outer end of the trowel 40 is propelled by an arm 44, secured to the frame 12 on the inside of the machine, and the trowel is provided with a weight 45 and rests at its free end on the top of the front board. What has been said about hinging the float to its end piece and making an adjustable connection between the float and the frame applies also to this trowel.

Back of the trowel 40 is a finishing-trowel 46. (See Figs. I, II, XIII, and XIV.) This trowel has an end piece 47, secured to the frame 12 on the gutter side of the machine by bolt and slot connection 48, and the outer end of the float is propelled by an arm 49, secured to the other side of the frame 12 of the machine. This trowel is preferably made of cast-iron pieces connected by a flexible steel strap 50, forming a hinge at 51, (see Fig. XIII,) the steel strap being somewhat wider than the cast-iron strips and being set at a slant, as shown in Figs. XIII and XIV, the extra width of the steel strap being behind or extending back of the cast-iron pieces, and is the only part that touches the concrete. It presses on the concrete lightly and at the same angle and in the same manner as a good workman holds his trowel when putting on the finishing touches to his work. The free end of the trowel 46 rests on the front board, and the trowel may be provided with a weight 52, as shown in Fig. XIII. Inasmuch as the thin steel will not present a sufficiently rigid surface for the arm 49 to press against, I secure a piece 53 to the free end of the trowel at its front edge, which the arm 49 engages, (see Fig. I,) so that this arm 49, unlike the arms 38 and 44, draws rather than pushes the outer end of the trowel.

54 represents washers placed between the yokes or end pieces 30, 36, 42, and 47 and the frame 12, and washers of different thicknesses may be employed when these yokes or end pieces are adjusted to different position, as stated.

I have now described the manner of applying the top stuff to the gutter and to the vertical wall or approximately-vertical wall of the curb; but the machine is also provided with means for finishing the top stuff on the upper edge of the curb and on its rounded upper inner corner. This mechanism I will now describe. It consists of one float corresponding to the float 33 and two trowels corresponding to the trowels 40 and 46. This float and trowels are carried on a swinging frame 55, connected to the frame 12 on the curb side of the machine by means of links 56, (see Figs. XV, XVI, and XVIII,) the links being pivoted to the frame 12 at 57 and to the frame 55 at 58. The frame 55 may be provided with weights 59 if its own weight is insufficient for the proper pressure.

60 represents the float secured to the frame 55, the outer end of which rests on the back board. (See Fig. XVI.) This float is preferably made of wood, with a curved inner end 61, provided with a metal point 62 to finish the rounded edge of the curb.

63 represents the bolts by which the float is secured to the frame 55.

64 represents the trowel secured to the frame 55 and which corresponds to the trowel 40. This trowel 64 (see Figs. XV and XVII) corresponds in shape to the float 60, it resting upon the back board and having a curved inner lower surface 65 and point 66. This trowel is preferably made of metal, the point 66 being of steel.

67 represents the bolts by which the trowel is secured to the frame 55.

68 represents the finishing-trowel secured to the frame 55, which corresponds to the finishing-trowel 46, this trowel being made of a metal body having a light steel face 69 wider than the body of the trowel, the extra width being behind the body 68, and the steel face being placed at an angle so that only its extra width bears upon the stuff, thus finishing the top of the curb after the same manner that the gutter and vertical part of the curb is finished by the trowel 46. The finishing-trowel 68 rides along on top of the back board, as shown in Fig. XVIII.

70 represents a striking-off piece secured to the frame 55 in advance of the float 60.

It will be seen that, the frame 55 being hinged to the frame 12, the striking-off piece, float, and trowels will always rest against the back board, and will always form the upper rounded edge of the curb smooth and even from summit to catch-basin, notwithstanding the main part of the machine is moved to a lower elevation in going from summit to catch-basin, so as to give the inclination to the gutter, while the top of the curb, as stated, is on a horizontal line from summit to catch-basin.

Fig. XIX shows the rough concrete of the curb partially tamped in between the strip 22 and the back board. Fig. XX shows the rough concrete all tamped in and the top stuff or finishing course being put on by the float, while Fig. XXI illustrates how the trowel 40 and the machine change in height in passing from the catch-basin to the summit.

The rails 3 and 4 are set at the same relative slant, while the front board is set at a lesser slant for the purpose of having the outer edge of the gutter higher than it would be if it followed the same slant-line that makes the curb six inches higher at the catch-basin than at the summit.

The means I have shown and described as being mounted on the carriage for forming the body of the curb consists of the strip 22, and if top or surface dressing is to be applied the means which I have described, consisting of the open end of the box, floats, and trowels shown in Figs. II, XV, XVI, XVII, XVIII, and XIX, may be employed, though it will be understood that I do not limit myself to the precise means shown for forming either the body of the curb or applying the dressing.

While I have shown and have described one float and two trowels for the gutter and the vertical part of the curb, and one float and two trowels for the top of the curb, respectively, it is evident that these parts may be increased or diminished in number without departing from the spirit of my invention; and it is likewise evident that for plain straight work, where no artificial slants have to be provided for, the floats and trowels may be rigidly connected to the frame of the machine at their respective ends; and I do not wish to be limited to these parts being either fixed or movable nor to details of construction as shown and described.

It is evident that by leaving off the parts of the machine that form the curb the remainder of the machine will be well adapted for gutter-work alone or for sidewalk or other flat work.

What I claim, and desire to secure by Letters Patent, is—

1. In an apparatus for making concrete work, a carriage, a receptacle for containing the top or surface dressing, and a float supported by the carriage back of said receptacle, in combination with mechanism mounted on the carriage for forming a curb, substantially as set forth.

2. In an apparatus for making concrete work, a carriage, a receptacle for containing the top or surface dressing adjustably secured to the carriage, and a float supported by the carriage back of said receptacle, in combination with mechanism mounted on the carriage for forming a curb, substantially as set forth.

3. In an apparatus for making concrete work, a carriage, a receptacle for containing the top or surface dressing, and a float adjustably secured to the carriage back of said receptacle, in combination with mechanism mounted on the carriage for forming a curb, substantially as set forth.

4. In an apparatus for making concrete work, a carriage, a receptacle for containing the top or surface dressing and which is adjustably secured to the carriage, and a float adjustably secured to the carriage back of said receptacle, in combination with mechanism mounted on the carriage for forming a curb, substantially as set forth.

5. In an apparatus for making concrete work, a carriage, a receptacle for containing the top or surface dressing, a float supported by the carriage back of said receptacle, and a trowel supported by the carriage back of said float, in combination with mechanism mounted on the carriage for forming a curb, substantially as set forth.

6. In an apparatus for making concrete work, a carriage, a receptacle for containing the top or surface dressing, a float supported by the carriage back of said receptacle, and a trowel adjustably secured to the carriage back of said float, in combination with mechanism mounted on the carriage for forming a curb, substantially as set forth.

7. In an apparatus for making concrete work, a carriage, a receptacle for containing the top or surface dressing, a float supported by the carriage back of said receptacle, a trowel supported by the carriage back of said float, and a finishing trowel supported by the carriage back of the first mentioned trowel, in combination with mechanism mounted on the carriage for forming a curb, substantially as set forth.

8. In an apparatus for making concrete work, a carriage, a receptacle for containing the top or surface dressing, a float supported by the carriage back of said receptacle, a trowel supported by the carriage back of said float, and a finishing trowel adjustably secured to the carriage back of said first mentioned trowel, in combination with mechanism mounted on the carriage for forming a curb, substantially as set forth.

9. In an apparatus for making concrete work, a carriage, a receptacle for containing the top or surface dressing and which is hinged with its connection to the carriage, and a float secured to the carriage back of said receptacle, in combination with mechanism mounted on the carriage for forming a curb, substantially as set forth.

10. In an apparatus for making concrete work, a carriage, a receptacle for containing the top or surface dressing, and a hinged float secured to the carriage back of said receptacle, in combination with mechanism mounted on the carriage for forming a curb, substantially as set forth.

11. In an apparatus for making concrete work, the combination of a carriage, a receptacle for containing the top or surface dressing, a float secured to the carriage back of said receptacle, and a jointed trowel secured to the carriage back of said float, substantially as set forth.

12. In an apparatus for making concrete work, the combination of a carriage, a receptacle for containing the top or surface dressing, a float secured to the carriage back of said receptacle, a trowel secured to the carriage back of said float, and a jointed finishing trowel secured to the carriage back of the first mentioned trowel, substantially as set forth.

13. In an apparatus for making concrete work, the combination of a carriage, a receptacle hinged to its connection with the carriage, a jointed float secured to the carriage back of the receptacle, a jointed trowel secured to the carriage back of said float, and a jointed finishing trowel secured to the carriage back of the first mentioned trowel, substantially as set forth.

14. In an apparatus for making concrete work, a carriage, a receptacle secured to the carriage for containing the top or surface dressing, and a trowel secured to the carriage back of said receptacle, in combination with mechanism mounted on the carriage for forming a curb, substantially as set forth.

15. In an apparatus for making concrete work, a carriage, a receptacle for containing the top or surface dressing, and a finishing trowel secured to the carriage back of said receptacle; said trowel being set at an angle with a thin working surface, in combination with mechanism mounted on the carriage for forming a curb, substantially as set forth.

16. In an apparatus for making concrete work, the combination of a carriage, a receptacle secured to the carriage for containing the top or surface dressing, and a float secured to the carriage back of said receptacle; said float having an approximately horizontal and an approximately vertical portion set at an angle, substantially as shown and described.

17. In an apparatus for making concrete work, the combination of a carriage, a receptacle, a float and a trowel secured to the carriage and each being jointed so as to permit its free end to move up and down, and arms secured to the carriage and which engage the free ends of the receptacle, float and trowel, substantially as set forth.

18. In an apparatus for making concrete work, the combination of front and back boards provided with rails, a carriage adapted to be supported by said rails, a receptacle, a float and a trowel secured to said carriage and each having a joint to permit its free end to always bear upon said front board, substantially as set forth.

19. In an apparatus for making concrete work, the combination of front and back boards, rails secured to the front and back boards, a carriage supported on said rails, a receptacle, float and trowel secured to said carriage and each having a joint, and arms secured to the carriage and adapted to engage the free ends of said receptacle, float and trowel, substantially as set forth.

20. In an apparatus for making concrete work, a carriage, and means supported by the carriage for delivering the top or surface dressing and working the same onto the rough concrete, in combination with mechanism mounted on the carriage for forming a curb, substantially as set forth.

21. In an apparatus for making concrete work, the combination of a back board and a carriage provided with a strip located in the side frame thereof for forming with the back board the rough concrete work of a curb, substantially as set forth.

22. In an apparatus for making concrete work, the combination of a back board and a carriage, and a strip secured to the carriage at an inclination and which is adapted to form the rough concrete work of the curb, substantially as set forth.

23. In an apparatus for forming concrete work, the combination of a back board and a carriage, a strip for forming the rough work of the curb of a gutter and which is set at an inclination, a receptacle for containing the top or surface dressing, and float and trowels for applying the dressing to the gutter and curb, substantially as set forth.

24. In an apparatus for making concrete work, a carriage, a receptacle for containing the top or surface dressing, a frame movably secured to the carriage, and a float secured to said frame to press the dressing on the top of the curb, in combination with mechanism mounted on the carriage for forming a gutter, substantially as set forth.

25. In an apparatus for forming concrete work, a carriage, a receptacle for containing the top or surface dressing, a frame movably secured to the carriage, and a float and trowels secured to said movable frame for applying the dressing to the top of the curb, in combination with mechanism mounted on the carriage for forming a gutter, substantially as set forth.

26. In an apparatus for making concrete work, a carriage, a receptacle for containing the top or surface dressing, a float and trowels secured to the carriage back of said receptacle for applying the dressing to the gutter and vertical part of the curb, and a float and trowels secured to the carriage back of said receptacle for applying the dressing to the top and rounded corners of the curb, in combination with mechanism mounted on the carriage for forming a gutter, substantially as set forth.

27. In an apparatus for making concrete work, the combination of a carriage, a receptacle for containing the top or surface dressing, a float and trowels secured to the carriage back of said receptacle for applying the dressing to the gutter and vertical part of the curb, and a float and trowels movably secured to the carriage for applying the dressing to the top and rounded corners of the curb, substantially as set forth.

28. In an apparatus for making concrete work, the combination of a carriage, a receptacle secured to the carriage, a float and trowels secured to the carriage back of said receptacle, for applying the dressing to the gutter and vertical part of the curb, a frame movably secured to the carriage, and a straight edge, float and trowels secured to said frame for applying the dressing to the top and rounded corner of the curb, substantially as set forth.

29. In an apparatus for making concrete work, the combination of a carriage having a frame adjustable in width, a box for containing the top or surface dressing, and a float and trowels secured to the carriage back of said receptacle, for forming the gutter, curb and rounded corner of the curb, substantially as set forth.

30. In an apparatus for making concrete work, the combination of a carriage having a jointed frame, said carriage being provided with a strip for forming the curb of a gutter in advance of the joint in the frame, and being provided with a receptacle and float and trowels back of the joint in the frame, substantially as and for the purpose set forth.

31. In an apparatus for making concrete work, the combination of a carriage having a hinged frame, and a strip secured to the frame forward of the hinge for forming the curb of a gutter, and having a receptacle and a float and trowels secured to the frame back of the hinge, substantially as set forth.

SAMUEL P. McKELVEY.

In presence of—
G. S. WHEELER,
H. F. JEROLAMAN.